(12) United States Patent
Sakai et al.

(10) Patent No.: US 11,618,377 B2
(45) Date of Patent: Apr. 4, 2023

(54) CONTROL APPARATUS, SYSTEM, COMPUTER-READABLE STORAGE MEDIUM, AND CONTROL METHOD

(71) Applicant: HONDA MOTOR CO., LTD., Tokyo (JP)

(72) Inventors: Rei Sakai, Saitama (JP); Yo Ito, Tokyo (JP); Toshikatsu Kuramochi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 63 days.

(21) Appl. No.: 17/184,626

(22) Filed: Feb. 25, 2021

(65) Prior Publication Data

US 2021/0284064 A1    Sep. 16, 2021

(30) Foreign Application Priority Data

Mar. 16, 2020  (JP) .............................. JP2020-045663

(51) Int. Cl.
  *B60Q 9/00*     (2006.01)
  *B60W 60/00*    (2020.01)
  *B60W 50/14*    (2020.01)

(52) U.S. Cl.
  CPC .............. *B60Q 9/00* (2013.01); *B60W 50/14* (2013.01); *B60W 60/001* (2020.02); *B60W 60/0053* (2020.02)

(58) Field of Classification Search
  CPC ....... B60Q 9/00; B60W 50/14; B60W 60/001; B60W 60/0053; B60W 60/0055; B60W 2556/50; B60W 60/005
  See application file for complete search history.

(56) References Cited

U.S. PATENT DOCUMENTS

2012/0003904 A1*  1/2012  Schmitz ................... B24B 1/00
                                                451/63
2012/0083904 A1*  4/2012  Adavi .............. G05B 19/41885
                                                700/29

FOREIGN PATENT DOCUMENTS

JP        2017165411 A      9/2017

* cited by examiner

*Primary Examiner* — Daryl C Pope

(57) ABSTRACT

A control apparatus for controlling notification data presented to an occupant of a movable object having an automated driving function. The control apparatus includes a travel road specification unit configured to specify a road scheduled to be travelled by the movable object corresponding to a destination set for the movable object. The control apparatus includes a setting unit configured to set, according to the road scheduled to be travelled, a switching recommendation point for switching from automated drive to driver-led manual drive on the road scheduled to be travelled, and estimate a scheduled passing time instant at which the movable object passes the switching recommendation point. The control apparatus includes a notification plan generation unit configured to generate a notification plan for presenting predetermined notification data to the occupant of the movable object according to the switching recommendation point and the scheduled passing time instant.

14 Claims, 12 Drawing Sheets

| TYPE | ASSOCIATION DEGREE WITH AUTOMATED DRIVING LEVEL | | | | | |
|---|---|---|---|---|---|---|
| | 5 | 4 | 3 | 2 | 1 | 0 |
| ROAD A | 10 | 10 | 10 | 10 | 10 | 10 |
| ROAD B | 10 | 10 | 10 | 10 | 10 | 10 |
| ROAD C | 10 | 10 | 10 | 10 | 10 | 10 |
| ADVERTISEMENT A | 6 | 6 | 6 | 2 | 2 | 2 |
| ADVERTISEMENT B | 4 | 4 | 4 | 4 | 4 | 2 |
| ADVERTISEMENT C | 2 | 2 | 2 | 0 | 0 | 0 |
| NEWS A | 6 | 6 | 6 | 6 | 6 | 6 |
| NEWS B | 4 | 4 | 4 | 1 | 1 | 0 |
| NEWS C | 2 | 2 | 2 | 0 | 0 | 0 |
| SMALL TALK | 1 | 1 | 1 | 0 | 0 | 0 |

*FIG. 8*

CONTROL APPARATUS, SYSTEM, COMPUTER-READABLE STORAGE MEDIUM, AND CONTROL METHOD

CROSS REFERENCE TO RELATED APPLICATION

The contents of the following Japanese patent application are incorporated herein by reference, Japanese Patent Application No. 2020-045663 filed on Mar. 16, 2020.

BACKGROUND

1. Technical Field

The present invention relates to a control apparatus, a system, a computer-readable storage medium, and a control method.

2. Related Art

Patent document 1 describes "obtaining a switching recommendation point for switching from automated drive to manual drive by a user's driving operation and providing a guidance".

CITATION LIST

Patent Document

[Patent document 1] Japanese Unexamined Patent Application Publication No. 2017-165411

BRIEF DESCRIPTION OF THE DRAWINGS

FIG. 8 illustrates one example of association degree information between the notification data and an automated driving level.

DESCRIPTION OF EXEMPLARY EMBODIMENTS

Hereinafter, the present invention will be described by way of exemplary embodiments of the invention, but the following embodiments are not intended to restrict the invention according to the claims. In addition, not all combinations of features described in the embodiments necessarily have to be essential to solving means of the invention.

Figure 1:
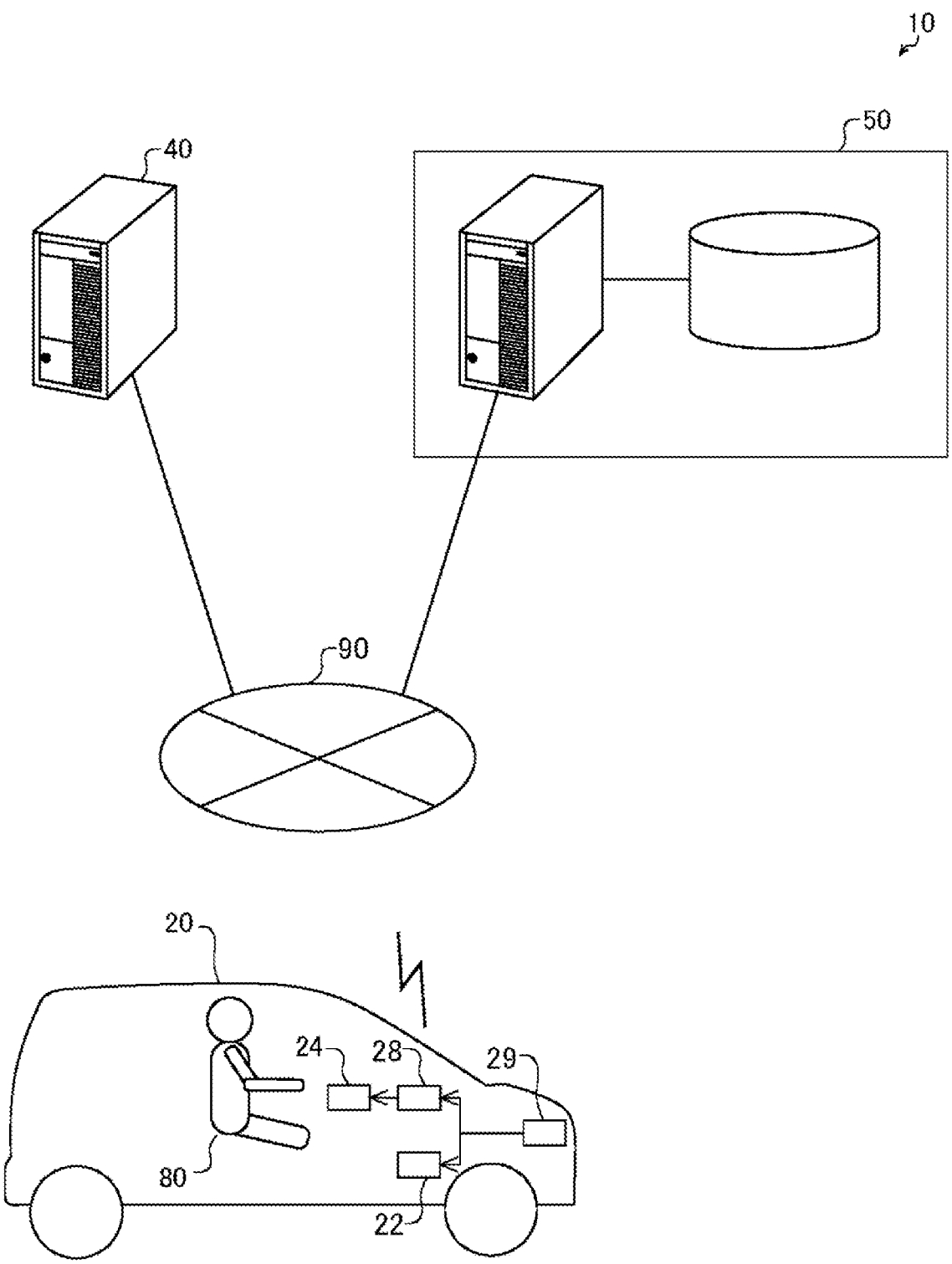
FIG. 1 schematically illustrates a configuration of a system 10.

FIG. 1 schematically illustrates a configuration of a system 10. The system 10 is provided with a movable object 20, a notification server 40, and a content server 50. The system 10 is a system configured to provide the movable object 20 with notification data.

The movable object 20, the notification server 40, and the content server 50 are connected to a network 90. The network 90 includes a communication line such as the Internet or a mobile communication network. The notification server 40 communicates with the content server 50 and the movable object 20 through the network 90.

The content server 50 obtains and stores, in a database, video data and text data provided by video distribution services on the network 90, text data and image data such as still image data and video data included in posted information on social network services (SNS), and image data and text data included in web pages and the like. In addition, the content server 50 obtains and stores, in the database, audio data, text data, and image data distributed through television broadcast and radio broadcast. The content server 50 obtains and stores, in the database, advertisement data from an advertisement distribution company. In addition, the content server 50 obtains and stores, in the database, news information from news providing company. The content server 50 sends content data to the notification server 40 according to a request from the notification server 40.

The content data may include, for example, time instant information, location information, and phenomenon information. The time instant information indicates a time instant associated with the phenomenon information. The location information indicates a location associated with the phenomenon information. The phenomenon information includes weather information, accident information, event information, roadwork information, traffic jam information, advertisement information, news information, and the like.

The movable object 20 has an automated driving function. The movable object 20 is provided with an automated drive control apparatus 22, a notification apparatus 24, a communication apparatus 28, and a sensor 29. The sensor 29 is provided with a radar, a camera, a positioning apparatus, a speed sensor, and the like. The automated drive control apparatus 22 is configured to provide the movable object 20 with the automated driving function. For example, the automated drive control apparatus 22 controls steering or acceleration and deceleration of the movable object 20 in an automated manner. The automated drive control apparatus 22 uses information obtained by the sensor 29 to control the steering or the acceleration and deceleration of the movable object 20 in an automated manner. The automated driving function by the automated drive control apparatus 22 may be an automated driving function for controlling the steering and the acceleration and deceleration in a mode in which an intervention degree to the driving by the system is increased. In this case, since an intervention degree to the driving by an occupant of the movable object 20 is relatively decreased, an attention degree of the occupant to a notification tends to be increased, which is preferable to provision of notification data. The automated drive control apparatus 22 may have a function of advanced driver-assistance systems (ADAS). The automated drive control apparatus 22 is implemented, for example, by an electronic control unit (ECU) provided with a microcomputer. The communication apparatus 28 communicates with the notification server 40 through the network 90. The communication apparatus 28 is configured to send destination information of the movable object 20 to the notification server 40. In addition, the communication apparatus 28 sends location information of the movable object 20, speed information of the movable object 20, control information related to the automated driving function of the movable object 20, image information of a surrounding of the movable object 20, and information related to the occupant 80 of the movable object 20 which are obtained by the sensor 29, and the like to the notification server 40. The communication apparatus 28 may be configured by including a telematics control unit (TCU). The occupant 80 may be a driver of the movable object 20.

The notification server 40 is configured to generate notification data based on information collected from a plurality of movable objects including the movable object 20 and information received from the content server 50. For example, based on a destination of the movable object 20, the notification server 40 specifies a route scheduled to be travelled to the destination. The notification server 40 decides automated driving levels of the movable object 20 in a plurality of sections in the route scheduled to be travelled based on road information of the route scheduled to be travelled. Note that automated driving levels of SAE J3016 may be applied as the automated driving levels, for example. In this case, an automated driving level 0 to an automated driving level 2 may correspond to a driver-led manual driving mode, and an automated driving level 3 to an automated driving level 5 may correspond to an automated driving mode led by the automated drive control apparatus 22.

In addition, the notification server 40 sets a passing point on the route scheduled to be travelled by the movable object 20. The notification server 40 obtains, from the content server 50, contents serving as a base of notification data provided to the occupant 80 based on information on a point where the automated driving level is switched and the passing point, occupant information obtained from the movable object 20, and the like, and generates the notification data. For example, the notification server 40 obtains content data which is associated with a switching point of the automated driving level of the movable object 20 and also associated with a time instant at which the movable object 20 passes the switching point, and generates a notification plan for setting timing of the notification data to be sent to the movable object 20. For example, the notification server 40 decides timing for presenting the notification data for switching the automated driving level. In addition, the notification server 40 decides a time instant and a duration for presenting the notification data. According to travelling of the movable object 20, the notification server 40 generates the notification data in accordance with the travel plan, and sends the notification data to the movable object 20.

In the movable object 20, when the communication apparatus 28 receives the notification data from the notification server 40, the notification apparatus 24 presents the notification data received by the communication apparatus 28 to the occupant 80. For example, the notification apparatus 24 has a human machine interface (HMI) function, and the notification apparatus 24 is configured to present the notification data in a form of audio information and image information. According to the system 10, the notification data related to the point where the movable object 20 travels and the switching of the automated driving level of the movable object 20 can be presented to the occupant 80 at an appropriate timing.

Figure 2:
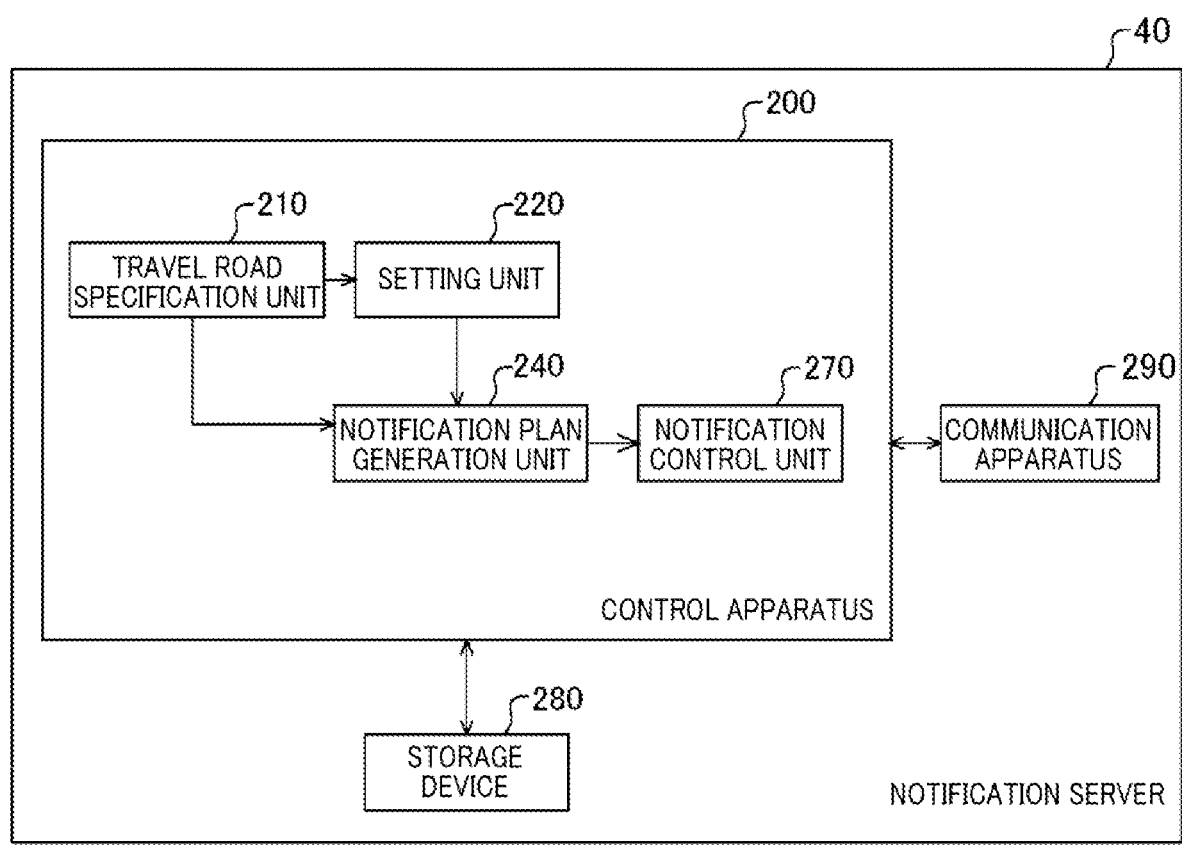
FIG. 2 illustrates a system configuration of a notification server 40.

FIG. 2 illustrates a system configuration of the notification server 40. The notification server 40 is provided with a control apparatus 200, a storage device 280, and a communication apparatus 290. The control apparatus 200 is implemented, for example, by being provided with an arithmetic processing unit including a processor. The storage device 280 is implemented by being provided with a non-volatile storage medium. The control apparatus 200 is configured to perform processing using information stored in the storage device 280. The communication apparatus 290 plays a role to communicate with the movable object 20 and the content server 50.

The control apparatus 200 is provided with a travel road specification unit 210, a setting unit 220, a notification plan generation unit 240, and a notification control unit 270.

The travel road specification unit 210 is configured to specify a road scheduled to be travelled by the movable object 20 corresponding to the destination set for the movable object 20. Note that the travel road specification unit 210 may obtain travel road information decided by a car navigation system included in the movable object 20.

The setting unit 220 is configured to set, according to the road scheduled to be travelled, a switching recommendation point for switching from the automated drive to the driver-led manual drive on the road scheduled to be travelled, and estimate an scheduled passing time instant at which the movable object 20 passes the switching recommendation point. The notification plan generation unit 240 is configured to generate a notification plan for presenting predetermined notification data to the occupant of the movable object 20 according to the switching recommendation point and the scheduled passing time instant.

The notification plan is configured by including the notification data and a plurality of management units in which the notification data is set. A notification time and at least any driving mode of corresponding automated driving mode and manual driving mode are set in the notification data. The plurality of management units are set in time units, corresponding to the switching recommendation point for switching the driving modes and a scheduled passing time according to the switching recommendation point. The notification plan generation unit 240 sets the notification data in the management unit according to a time of the management unit. The setting unit 220 sets the automated driving mode scheduled for each of the road scheduled to be travelled. The notification plan generation unit 240 may set the notification data permitted according to the automated driving mode set for the road scheduled to be travelled in the management unit. Note that the automated driving levels of SAE J3016 described according to the present embodiment are one example of the automated driving modes.

The notification control unit 270 is configured to cause notification based on the notification data in accordance with the notification plan generated by the notification plan generation unit 240. For example, the notification control unit 270 causes the notification to the occupant 80 by sending the notification data to the movable object 20 through the communication apparatus 290. The notification control unit 270 further causes change notice of the automated driving mode to the occupant 80 at the switching recommendation point according to the automated driving mode set for the road scheduled to be travelled.

The setting unit 220 changes the automated driving mode recommended for the road scheduled to be travelled according to the notification data. In this case, the notification control unit 270 presents the notification data serving as a change factor of the automated driving mode for the road scheduled to be travelled before the switching recommendation point of the automated driving mode to be changed is reached.

Along with presentation of the notification data serving as the change factor of the automated driving mode, in a case where another switching recommendation point exists in a predetermined range from the point where the driving mode is to be changed according to the change factor of the automated driving mode, the setting unit 220 aborts the change of the automated driving mode at the other switching recommendation point.

The notification plan generation unit 240 may generate a plurality of notification plans including a plurality of pieces of notification data from a current location, a passing point, or a destination of the movable object 20, and select and present notification data corresponding to the switching recommendation point among the plurality of pieces of notification data included in the plurality of generated notification plans.

Figure 3:
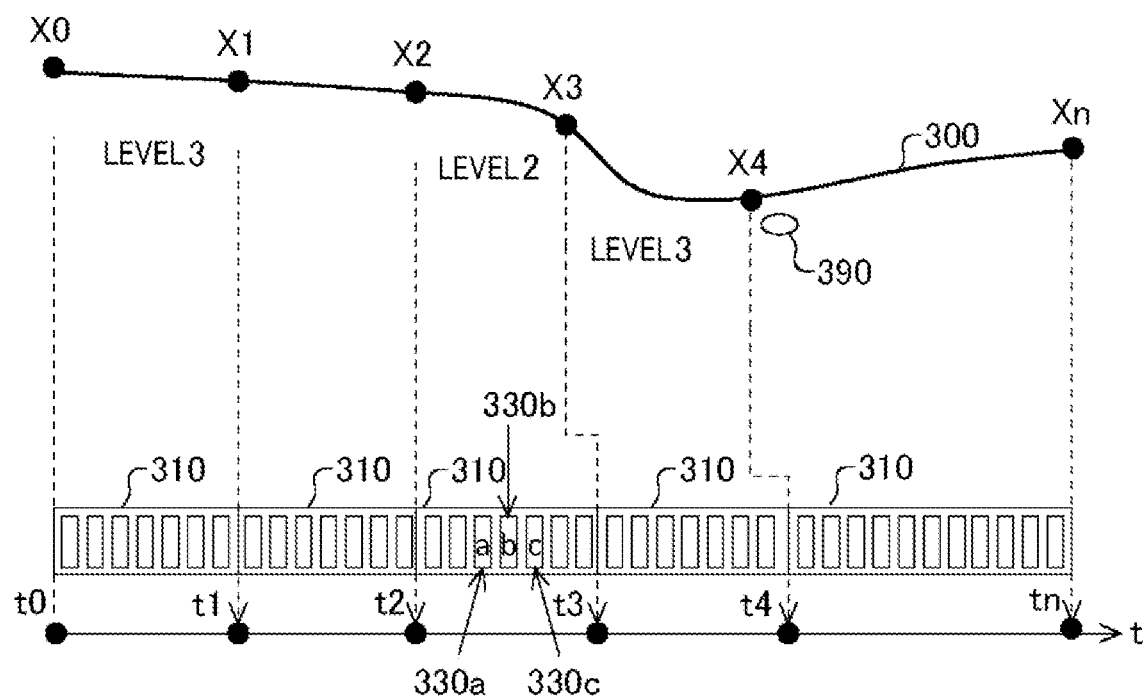
FIG. 3 is a diagram for describing a unit of management (management unit) in which notification data is set.

FIG. 3 is a diagram for describing the management unit in which notification data is set. A point X0 is a point of departure of the movable object 20. A point Xn is a destination of the movable object 20. A road scheduled to be travelled 300 is a road where the movable object 20 is scheduled to travel. The road scheduled to be travelled 300 is decided by the travel road specification unit 210.

The setting unit 220 sets a plurality of points including points X1 to X4 on the road scheduled to be travelled 300. For example, in a case where the setting unit 220 decides that the movable object 20 travels on a road from the point X0 to the point X2 at the automated driving level 3, the movable object 20 travels from the point X2 to the point X3 at the automated driving level 2, and the movable object 20 travels from the point X3 to the point X4 at the automated driving level 3, the setting unit 220 sets X2 and X3 as the switching recommendation points for switching the automated driving level.

In addition, in a case where a distance between the point X0 and the point X2 exceeds a predetermined distance, the setting unit 220 sets the point X1 between the point X0 and the point X2. For example, the setting unit 220 may decide the point X1 according to a travel time of the movable object 20. For example, the setting unit 220 may decide a point where the movable object 20 has travelled for approximately 1 hour from the point X0 as X1. In addition, the setting unit 220 sets, on the road scheduled to be travelled 300, the point X4 near a point where a specific spot 390 such as a tourist attraction or a facility exists.

The notification plan generation unit 240 sets one management unit 310 in each of a plurality of periods separated by time instants corresponding to the points set by the setting unit 220. The notification plan generation unit 240 sets a plurality of pieces of notification data 330 in each of the management units 310. As one example, the notification plan generation unit 240 sets notification data 330c for notifying the occupant 80 of the switching of the automated driving level in a management unit ahead of timing corresponding to the switching recommendation point X2. In addition, the notification plan generation unit 240 sets notification data 330b serving as advertisement data and notification data 330a serving as news data before the notification data 330c. The notification plan generation unit 240 selects the advertisement data and the news data to be set as the notification data 330 in the management unit based on interest information of the occupant 80 and a point where the movable object 20 exists at a notification timing. In this manner, the notification plan generation unit 240 generates the notification plan in advance based on the switching recommendation point of the automated driving level, and the notification control unit 270 causes transmission of the notification data to the movable object 20 in accordance with the notification plan generated by the notification plan generation unit 240.

Figure 4:
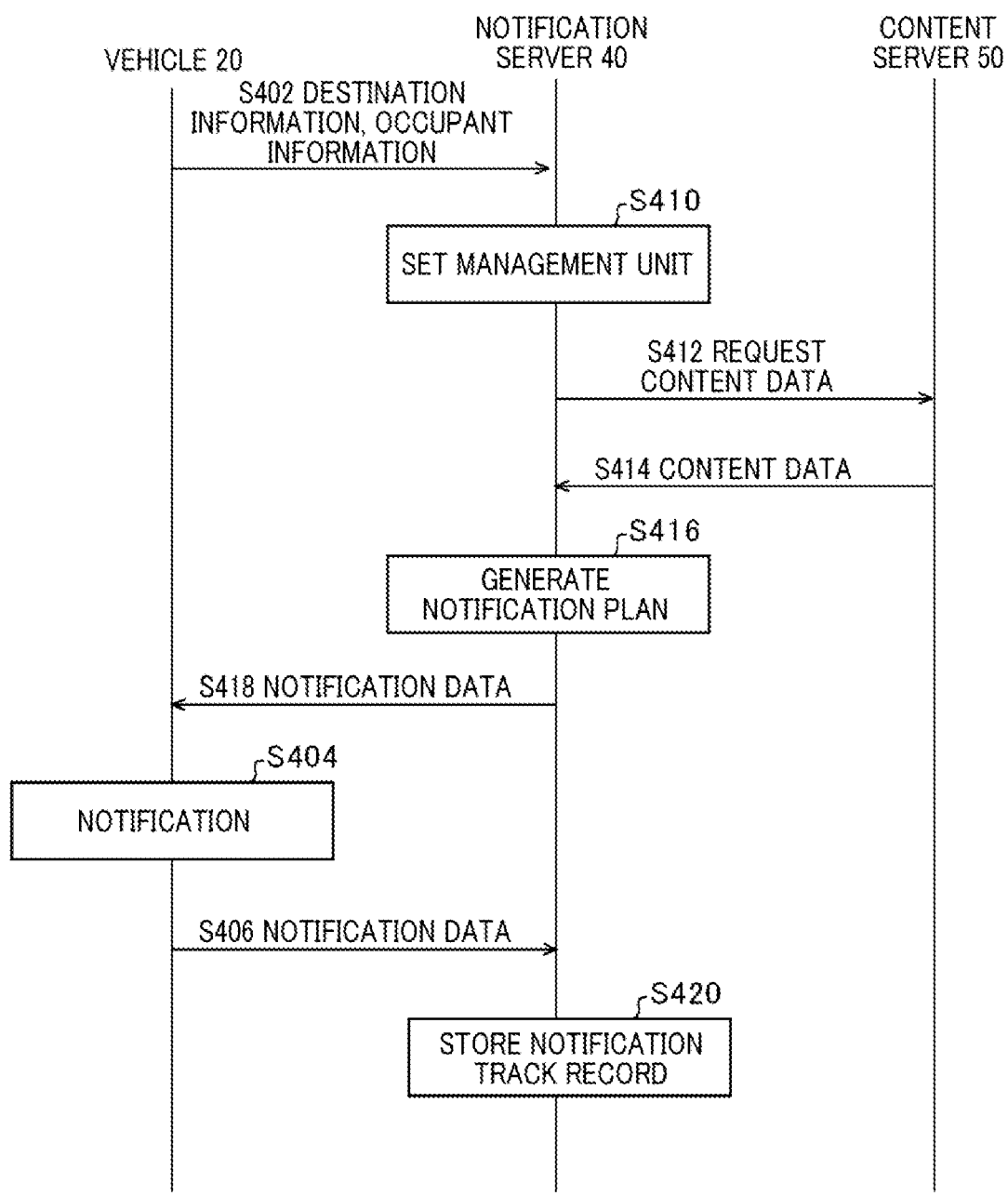
FIG. 4 illustrates a flow of data among a movable object 20, the notification server 40, and a content server 50.

FIG. 4 illustrates a flow of data among the movable object 20, the notification server 40, and the content server 50. In S402, the communication apparatus 28 sends the destination information set by the occupant 80 and information of the occupant 80 to the notification server 40. The information of the occupant 80 may include identification information of the occupant 80, interest information of the occupant 80, or the like. In S410, the notification plan generation unit 240 sets the management unit. Specifically, the travel road specification unit 210 sets the road scheduled to be travelled based on the destination and the road information, the setting unit 220 sets the automated driving levels of the movable object 20, the switching recommendation points X, and time instants when the movable object 20 passes the points X at the respective spots, and the notification plan generation unit 240 sets the management unit.

In S412, the communication apparatus 290 is configured to send request information for content data associated with the point on the road scheduled to be travelled to the content server 50. In S414, the communication apparatus 290 receives the content data from the content server 50. In S416, the notification plan generation unit 240 generates notification data based on the content data, and assigns the notification data into the management unit. In S418, the communication apparatus 290 sends the notification data to the movable object 20. In S404, the notification apparatus 24 presents notification to the occupant 80 in accordance with the received notification data. In a case where the notification data is advertisement data. after the notification apparatus 24 presents the notification, in S406, the communication apparatus 28 sends, to the notification server 40, information indicating that the notification data has been presented. In S420, the notification server 40 stores notification track record information indicating the completion of the notification in the storage device 280. The notification server 40 charges a business operator who has provided the content data based on the notification track record information.

Figure 5:
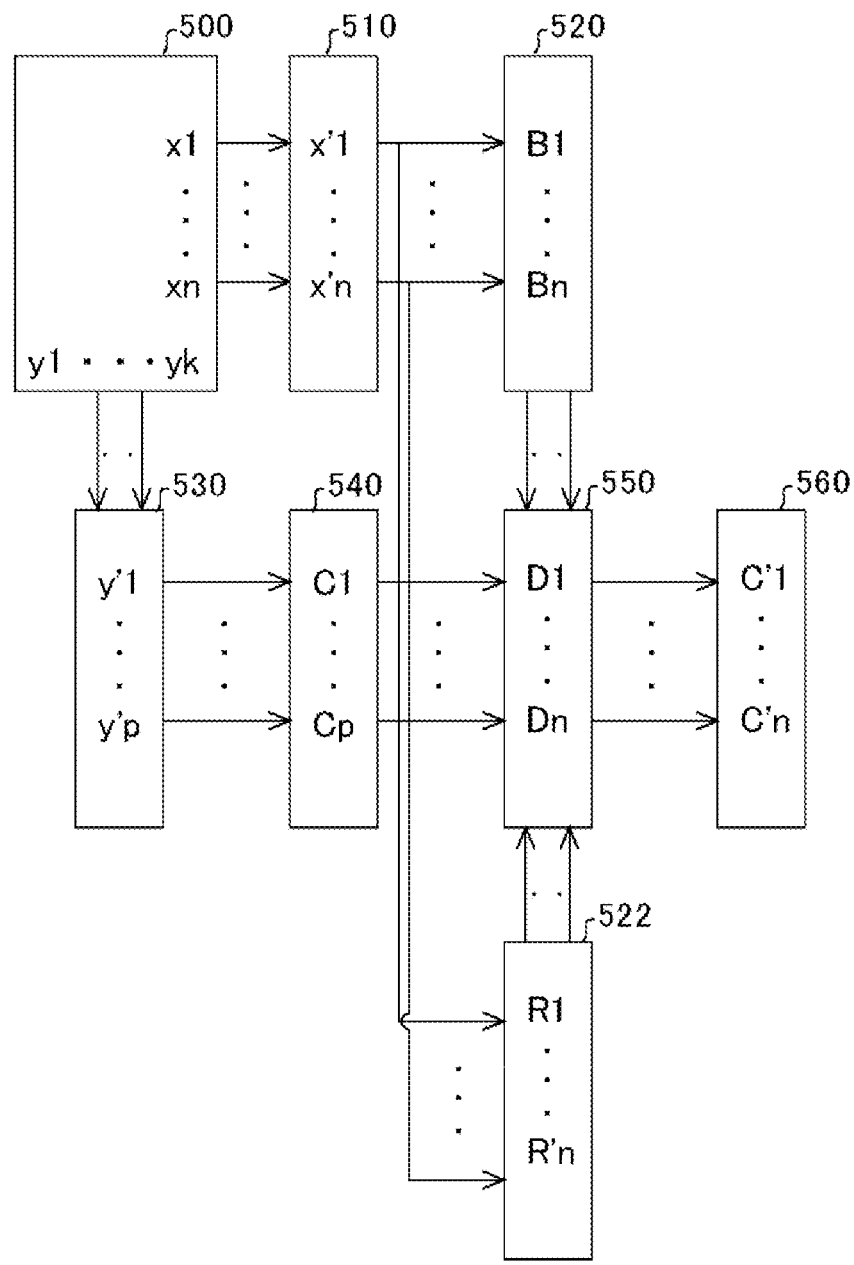
FIG. 5 illustrates one example of a generation flow of a notification plan.

FIG. 5 illustrates one example of a generation flow of the notification plan. The setting unit 220 generates passing point information x (x1 to xn) and switching recommendation point information y (y1 to yk) based on information of the road scheduled to be travelled specified by the travel road specification unit 210 based on a current location and a destination of the movable object 20 (block 500). The setting unit 220 specifies point information x' (x'1 to x'n) associated with the passing point information x (block 510). The notification plan generation unit 240 generates notification data B (B1 to Bn) based on the point information x' (block 520). The notification data B may be notification data generated, for example, from the content data locally managed by the notification server 40 itself. In addition, the notification plan generation unit 240 obtains notification data R and R' (R1 to Rn, R'1 to R'n) based on the point information associated with the passing point information x (block 522). The notification data R may be notification data generated, for example, from content data obtained from the content server 50.

The notification plan generation unit 240 specifies point information y' (y'1 to y'p) associated with the switching recommendation point y (block 530). The notification plan generation unit 240 obtains notification data C (C1 to Cp) based on the point information y' (block 540). The notification data C may be notification data generated from the content data obtained from the content server 50. The notification data C may be notification data generated by the notification server 40. For example, the notification data C may be notification data for notification on the switching of the automated driving level.

The notification plan generation unit 240 generates a set D (D1 to Dn) of the notification data B, the notification data R, and the notification data C (block 550). The notification plan generation unit 240 decides an order of the notification data to be set in the management unit from the set D, and sets the notification data (C'1 to C'q) in the management unit (block 560). In this manner, the notification plan generation unit 240 generates the notification plan.

Figure 6:
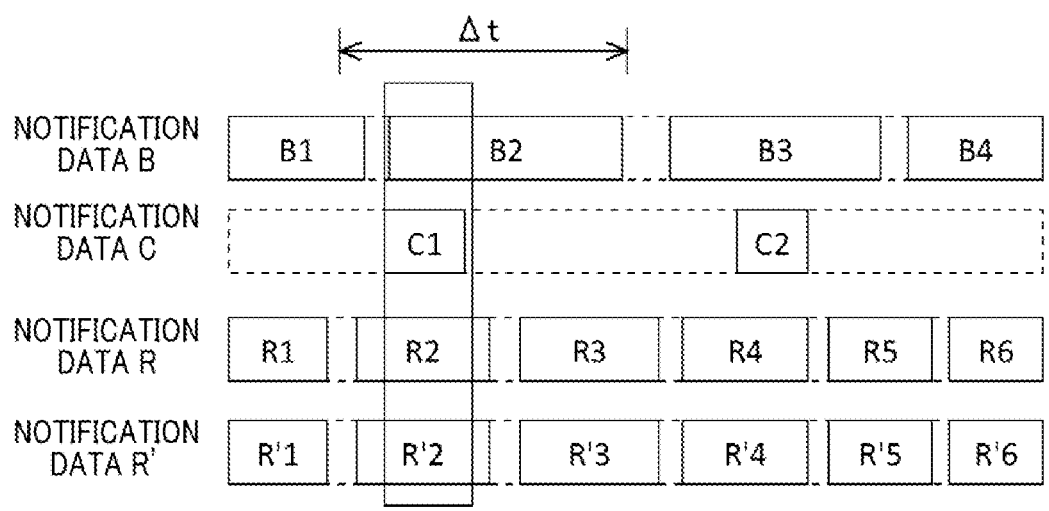
FIG. 6 illustrates another example of the generation flow of the notification plan.

FIG. 6 illustrates another example of the generation flow of the notification plan. The notification data B, the notification data C, the notification data R, and the notification data R' are the notification data generated by a method similar to the method described in association with FIG. 4. The notification plan generation unit 240 arranges the notification data B in accordance with predetermined criteria in a time series manner. Similarly, the notification plan generation unit 240 arranges the notification data C in accordance with predetermined criteria in a time series manner. In addition, the notification plan generation unit 240 arranges the notification data R in accordance with predetermined criteria in a time series manner. In addition, the notification plan generation unit 240 arranges the notification data R' in accordance with predetermined criteria in a time series manner. In a case where the notification data to be presented in a future period Δt is selected, the notification plan generation unit 240 selects and presents one piece of notification data among a plurality of pieces of notification data arranged in Δt. For example, the notification plan generation unit 240 selects one piece of notification data among a plurality of pieces of notification data B2, C1, R2, and R'2.

Note that the notification plan generation unit 240 may select one piece of notification data based on priority information associated with each of the plurality of pieces of notification data. In addition, the notification plan generation unit 240 may select a plurality of pieces of notification data. For example, the notification plan generation unit 240 may select the notification data C1 and the notification data R2 as the notification data to be presents in Δt. In this case, the notification plan generation unit 240 may perform such a setting that the notification data C1 and the notification data R2 are shifted in the period Δt to be presented.

In this manner, the notification plan generation unit 240 may generate the plurality of notification plans including the plurality of pieces of notification data from the current location, the passing location, or the destination of the movable object 20, and select and present the notification data corresponding to the switching recommendation point among the plurality of pieces of notification data included in the plurality of generated notification plans.

Figure 7:
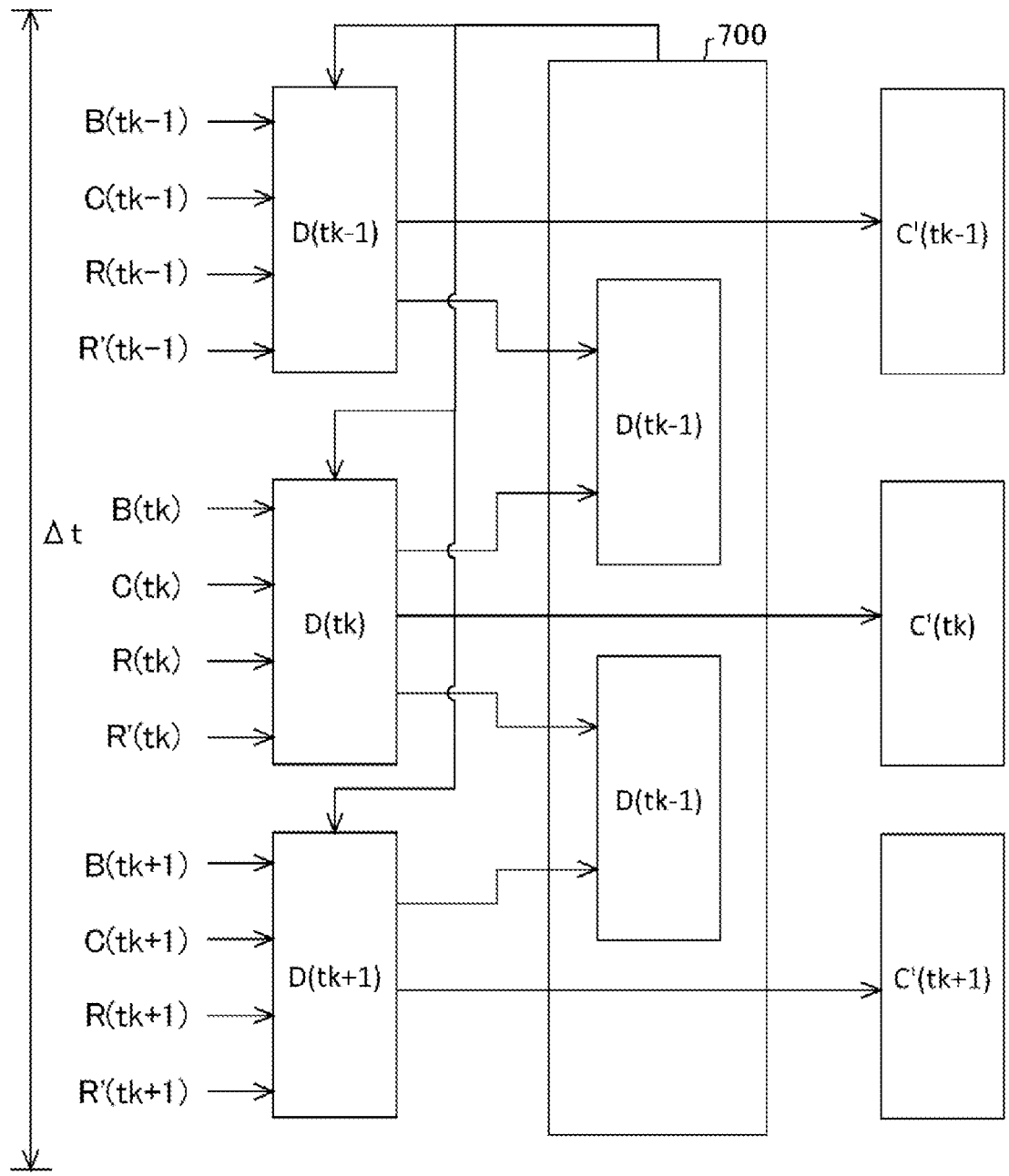
FIG. 7 illustrates another example of the generation flow of the notification plan.

FIG. 7 illustrates another example of the generation flow of the notification plan. The notification data B, the notification data C, the notification data R, and the notification data R' are notification data generated by a method similar to the method described in association with FIG. 4. In addition, in FIG. 7, characters in brackets in each of the notification data B, the notification data C, the notification data R, and the notification data R' represent a time instant. For example, B(tk) denotes the notification data selected as the notification data that may be presented at a time instant tk in accordance with the predetermined criteria.

The notification plan generation unit 240 temporarily selects notification data D (D(tk−1), D(tk), D(tk+1)) that should be presented at each time instant (tk−1, tk, tk+1) in the period Δt. The notification plan generation unit 240 obtains the notification data D in a time series manner to obtain differential information (block 700), and selects the notification data selected as the notification data D such that the differential information satisfies a predetermined condition. For example, in a case where the automated driving level is associated with the notification data, the notification plan generation unit 240 may set a rate of change of the automated driving level per unit time to be below a predetermined value. The association between the notification data and the automated driving level will be described below. In addition, in a case where information intensity of the notification data is associated with the notification data, the notification plan generation unit 240 may set a rate of change of the information intensity per unit time to be equal to or higher than a predetermined value. The information intensity may be associated with the notification data in advance according to the contents presented as the notification data, for example. The notification plan generation unit 240 may set a provided amount of the notification data per unit time which is generated from the advertisement data to be equal to or higher than a predetermined value.

In a case where a combination of the notification data D in which the differential information satisfies a predetermined condition is found, the notification plan generation unit 240 decides the notification data D as the notification data C' to be presented. Note that in a case where the combination of the notification data D satisfying the predetermined condition is not decided, the setting unit 220 may change the automated driving level of the movable object 20 and search for the notification data D again. In addition, in a case where the notification data satisfying the predetermined condition is not decided, the travel road specification unit 210 may change the road scheduled to be travelled by the movable object 20 and search for the notification data D again.

FIG. 8 illustrates one example of association degree information between the notification data and the automated driving level. The association degree information is information indicating an association degree between a type of the notification data and the automated driving level.

In the "association degree", a value is set between 0 and 10 according to the strength of association. The association degree 10 indicates that the association with the corresponding automated driving level is the highest. The association degree 0 indicates that there is no association with the corresponding automated driving level. The notification data of the type in which the association degree 0 is set indicates that the presentation of this notification data is not permitted at the corresponding automated driving level. The notification data of the type in which the association degree 1 or above is set indicates that the presentation of this notification data is permitted at the corresponding automated driving level. The association degree 0 indicates that the presentation of the notification data is not permitted while the movable object 20 travels at the corresponding automated driving level.

In the type of the notification data, a "road A" represents notification data associated with a change of the automated driving level. For example, the "road A" includes notification data for notification on the change of the automated driving level.

A "road B" represents notification data affecting the automated drive. The "road B" includes notification data for notification on occurrence of an accident or the like.

A "road C" represents notification data associated with a change of the destination. For example, the "road C" includes notification data for notification on occurrence of fire at the destination, notification data for notification on a hazardous weather at the destination, notification data for notification on a possibility of a severe delay of the arrival at the destination, or the like.

As the association degree with the automated driving level, "10" is set in the "road A", the "road B", and the "road C". Therefore, the notification data corresponding to the "road A", the "road B", and the "road C" is presented by priority at all the automated driving levels.

An "advertisement A" represents advertisement data in which it is presumed that the occupant 80 has an interest. The advertisement in which it is presumed that the occupant 80 has the interest may be specified based on history information of the destinations of the occupant 80, a change of facial expression of the occupant 80 in a case where the notification data of the advertisement data is presented, or the like.

An "advertisement B" represents advertisement data related to a point in proximity to the road scheduled to be travelled. The "advertisement B" includes advertisement data at the point in proximity to the road scheduled to be travelled by the movable object 20. An "advertisement C" represents advertisement data that does not correspond to any of the "advertisement A" and the "advertisement B". In the "advertisement C", the association degree "0" is set for the automated driving level 2 or below. For this reason, in a case where the automated driving level is 2 or below, the presentation of the notification data corresponding to the "advertisement C" is not permitted.

"News A" represents news data in which it is presumed that the occupant 80 has an interest. Whether this data is news data in which it is presumed that the occupant 80 has the interest may be specified based on the change of the facial expression of the occupant 80 when the news data is presented, or the like.

"News B" represents news data related to a point in proximity to the road scheduled to be travelled. The "news B" includes news data for notification of news occurring at the destination of the movable object 20. In the "news B", the association degree "0" is set for the automated driving level 0. For this reason, in a case where the automated driving level is 0, the presentation of the notification data of the "news B" is not permitted.

"News C" represents news data that does not correspond to any of the "news A" and the "news B". A "small talk" is notification data presented accompanying with a chat such as an SNS, a conversation system, and a conversation. In the "news C" and the "small talk", the association degree "0" is set for the automated driving level equal to or lower than level 2. For this reason, in a case where the automated driving level is 2 or below, the presentation of the notification data of the "news C" and the notification data of the "small talk" is not permitted.

The notification plan generation unit 240 refers to the association degree information, and sets, in the management unit, the notification data associated with the association degree "1" or above for the automated driving level that is set for the road scheduled to be travelled. In this manner, for example, it is possible to reduce the possibility of unnecessary intervention to the occupant 80 which might occur when the notification data related to the "small talk" is presented during the driving at the automated driving level 0. Note that the notification plan generation unit 240 may set the notification data having a higher association degree in the management unit in a more preferential manner. In this manner, the notification data appropriate at the current automated driving level can be presented.

Figure 9:
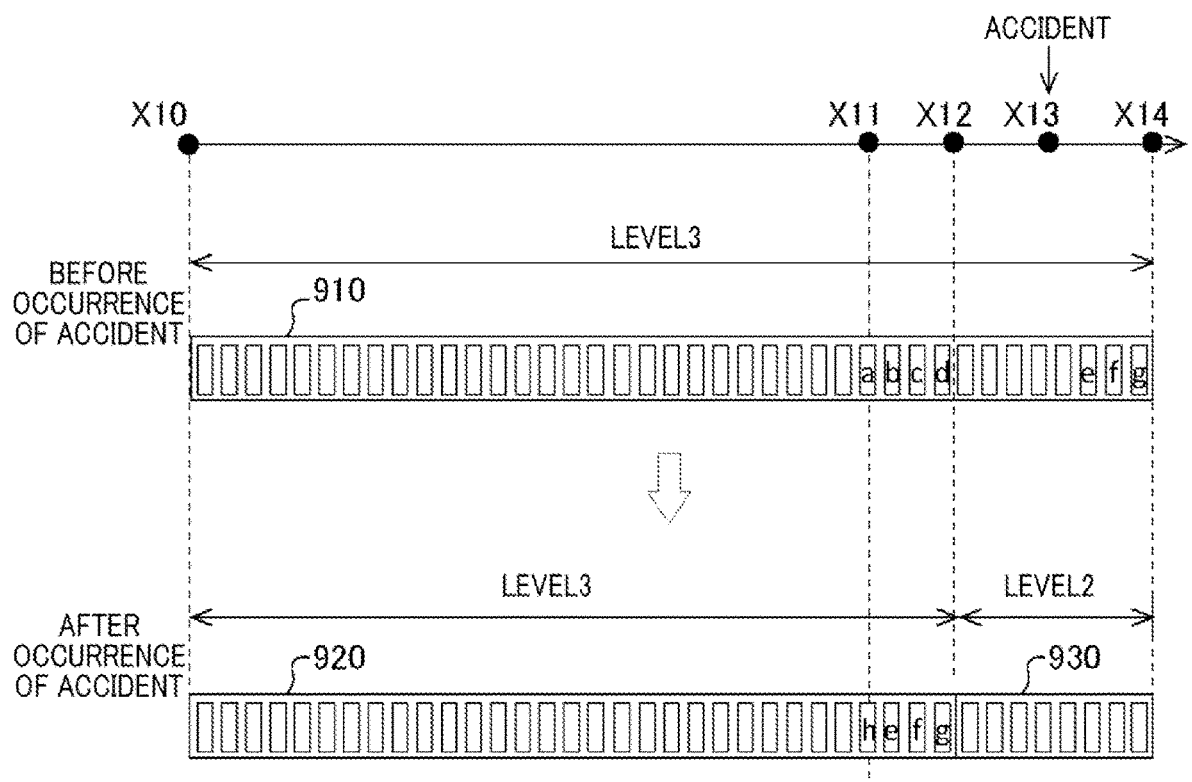
FIG. 9 illustrates one example of a method of changing the notification plan according to a change of the automated driving level.

FIG. 9 illustrates one example of a method of changing the notification plan according to the change of the automated driving level. Examples of a factor for changing the automated driving level may include occurrence of an accident on the road scheduled to be travelled by the movable object 20, and the like. In a case where the notification server 40 determines that an accident has occurred on the road scheduled to be travelled by the movable object 20 from traffic information, information collected by another movable object, SNS information, and the like, the notification plan generation unit 240 generates notification data indicating the occurrence of the accident.

In FIG. 9, it is set that the movable object 20 travels at the automated driving level 3 from a point X10 to a point X14. When an accident occurs at a point X13, based on the accident occurrence point X13, the setting unit 220 determines that the automated driving level needs to be lowered to 2 at the accident occurrence point X13. The setting unit 220 sets the automated driving level at 2 in a section between a point X12 to the point X14 including the point X13.

Then, according to the change of the switching point of the automated driving level, the notification plan generation unit 240 changes a management unit 910 to a management unit 920 and a management unit 930, and also changes the notification plan. Specifically, the notification plan generation unit 240 generates notification data h to be presented at a point X11 at a predetermined distance to the point X12 where the automated driving level is switched. For example, additional notification data h stating "An accident has occurred. The automated driving level is changed from level 3 to level 2 in ○ km." is generated.

Then, the notification plan generation unit 240 deletes notification data a to d corresponding to the section between the point X11 to the point X12 in the notification plan before the accident has occurred, and sets the notification data h in a location of the notification data a. In addition, the notification plan generation unit 240 sets a predetermined number of notification data e to g to be presented near the switching recommendation point X14 in locations of the notification data b to d in the notification plan before the accident has occurred. In this manner, before the point X12 where the automated driving level is switched is reached, the notification data related to the occurrence of the accident and the lowering of the automated driving level can be presented to the occupant 80. In addition, a notification plan can be created in which the notification data e to g scheduled to be presented near the switching recommendation point X14 in the notification plan before the accident has occurred is presented near the new switching recommendation point X12.

In this manner, the setting unit 220 can change the automated driving level recommended for the road scheduled to be travelled according to the notification data, and the notification control unit 270 can present the notification data serving as the change factor of the automated driving level of the road scheduled to be travelled before the switching recommendation point of the automated driving level to be changed is reached. Note that the notification plan generation unit 240 may repeat regeneration of the notification plan time each time a predetermined time has elapsed.

For example, the notification plan generation unit 240 may regenerate the notification plan in a case where a difference between a passing time instant of the switching recommendation point which is estimated when a latest notification plan is generated and a currently predicted passing time instant of the switching recommendation point exceeds a predetermined value.

Figure 10:
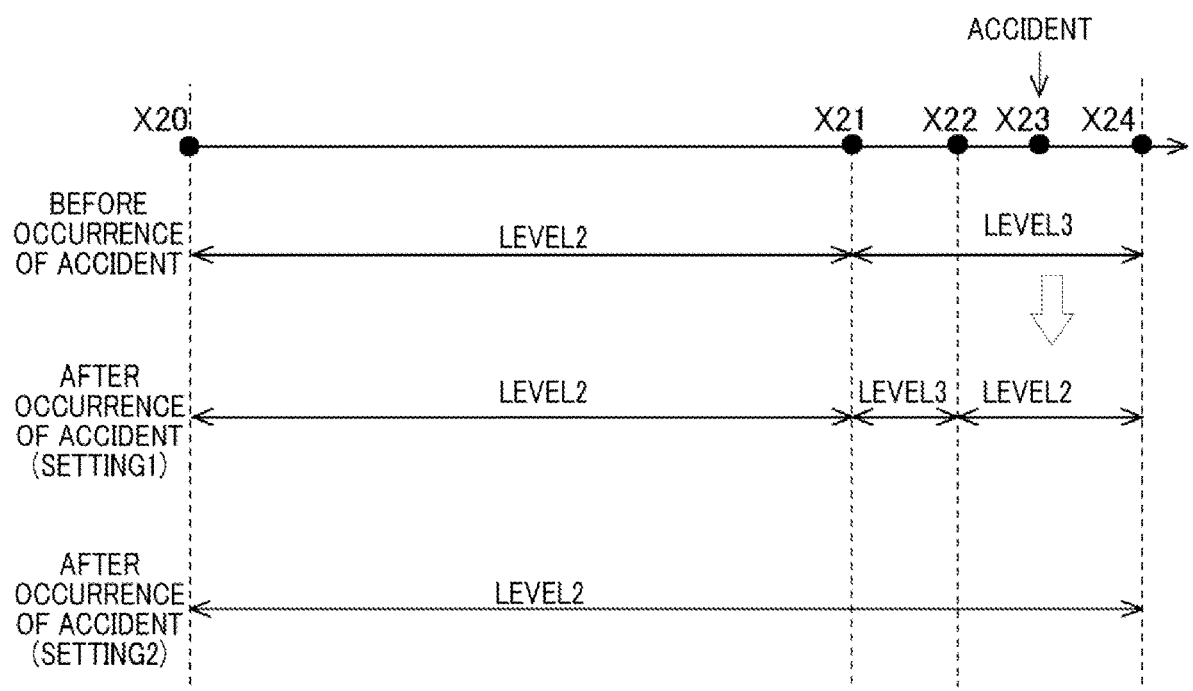
FIG. 10 illustrates one example of switching control of the automated driving level.

FIG. 10 illustrates one example of switching control of the automated driving level. First, it is assumed that the automated driving level 2 is set in a section between a point X20 and a point X21, and the automated driving level 3 is set in a section between the point X21 and a point X24. It is assumed that an accident occurs at a point X23, and the automated driving level is required to be lowered to 2 in a section between a point X22 and the point X24.

At this time, when the automated driving level is lowered to 2 in the section between the point X22 and the point X24, after the automated driving level is raised from 2 to 3 at the point X21, the automated driving level is required to be immediately lowered to 2 (setting 1). In view of the above, the setting unit 220 aborts the switching of the automated driving level at the point X21 (setting 2). In this manner, the frequent switching of the automated driving level can be avoided.

Figure 11:
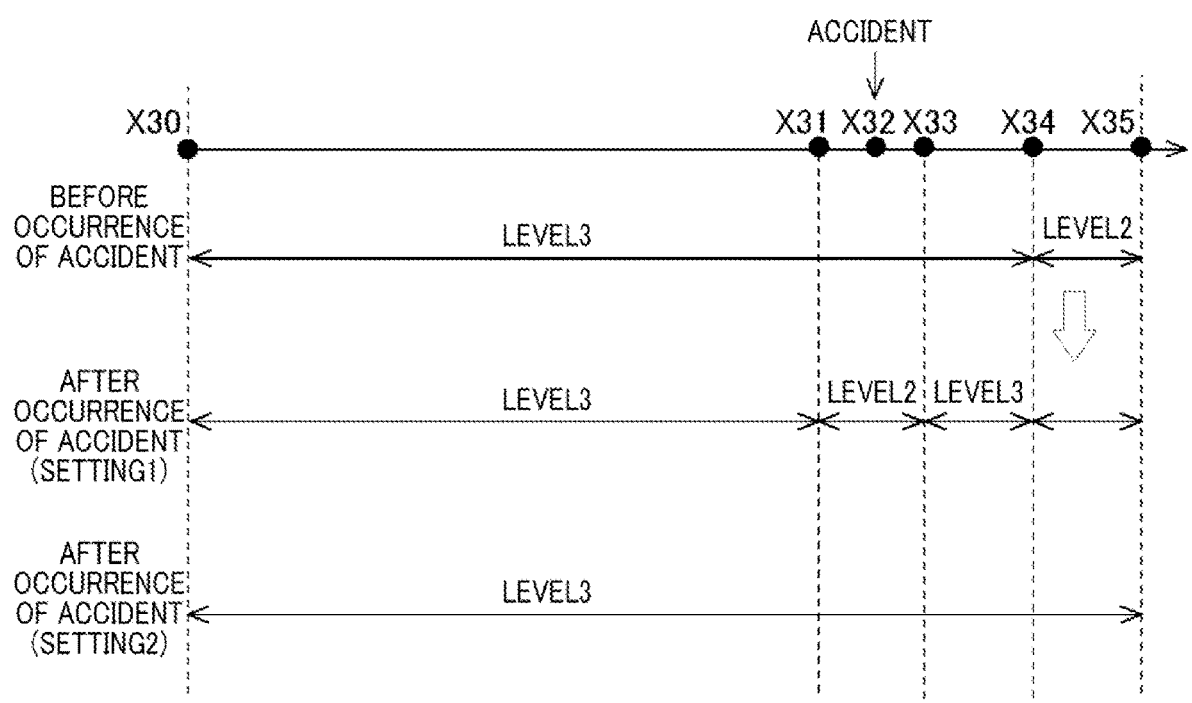
FIG. 11 illustrates another example of the switching control of the automated driving level.

FIG. 11 illustrates another example of the switching control of the automated driving level. First, it is assumed that the automated driving level 3 is set in a section between a point X30 and a point X34, and the automated driving level 2 is set in a section between the point X34 and a point X35. It is assumed that as a result of occurrence of an accident at a point X32, the automated driving level is required to be lowered to 2 in a section between a point X31 and a point X33.

At this time, when the automated driving level is lowered to 2 in the section between the point X31 and the point X33, after the automated driving level is raised from 2 to 3 at the point X33, the automated driving level is required to be immediately lowered to 2 at the point X34. In view of the above, the setting unit 220 aborts the switching of the automated driving level at the point X33. In this manner, the frequent switching of the automated driving level can be avoided.

As described in association with FIG. 10 and FIG. 11, in a case where another switching recommendation point exists in a predetermined range from the point where the automated driving level is changed according to the change factor of the automated driving level, the setting unit 220 aborts the change of the automated driving level at the other switching recommendation point.

As described above, according to the system 10, the management units separated by the switching point of the automated driving level are set, and the notification data to the occupant 80 can be set in the management units. For example, the switching point of the automated driving level is also a section where driving consciousness of the occupant 80 is required to be switched. According to the system 10, since the management units are separated by the switching point of the automated driving level, information with which the driving consciousness of the occupant 80 is easily switched can be delivered to the occupant 80.

The movable object 20 is, for example, transport equipment. The transport equipment includes an automobile such as a passenger car or a bus, a vehicle such as a saddle-type vehicle or a bicycle, a robot, or the like.

Note that the movable object 20 may have at least a part of the functions of the notification server 40 described above. For example, the notification apparatus 24 may have the function of the travel road specification unit 210. The notification apparatus 24 may have the function of the setting unit 220. The notification apparatus 24 may have the function of the notification plan generation unit 240.

Figure 12:
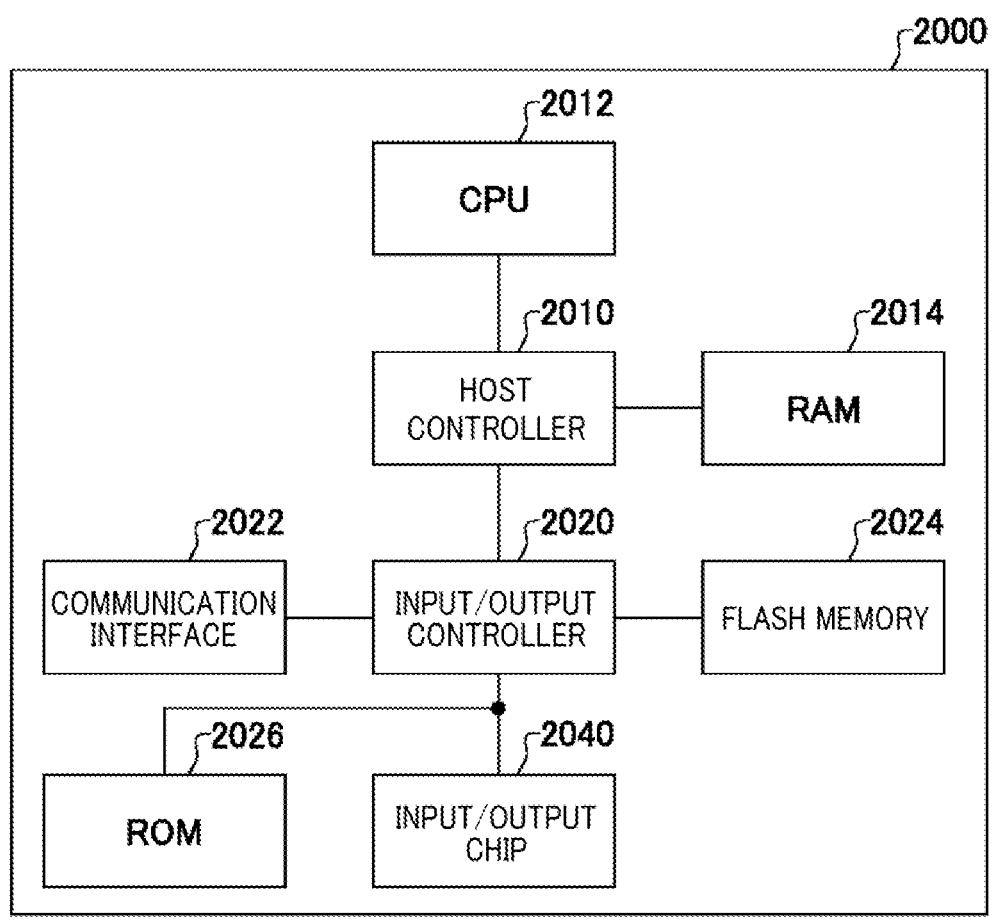
FIG. 12 illustrates an example of a computer 2000.

FIG. 12 illustrates an example of a computer 2000 where a plurality of embodiments of the present invention may be entirely or partially embodied.

Programs installed in the computer 2000 can cause the computer 2000 to: function as apparatuses such as the control apparatus 200 according to the embodiments, or each unit of the apparatuses; execute operations associated with the apparatuses or each unit of the apparatuses; and/or execute a process according to the embodiments or steps of the process. Such programs may be executed by a central processing unit (CPU) 2012 in order to cause the computer 2000 to execute a specific operation associated with some or all of the processing procedures and the blocks in the block diagram described in this specification.

The computer 2000 according to this embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to the programs stored in the ROM 2026 and the RAM 2014, thereby controlling each unit.

The communication interface 2022 communicates with other electronic devices via a network. The flash memory 2024 stores the programs and data used by the CPU 2012 in the computer 2000. The ROM 2026 stores a boot program or the like executed by the computer 2000 during activation, and/or a program depending on hardware of the computer 2000. The input/output chip 2040 may also connect various input/output units such as a keyboard, a mouse, and a monitor, to the input/output controller 2020 via input/output ports such as a serial port, a parallel port, a keyboard port, a mouse port, a monitor port, a universal serial bus (USB) port, a high-definition multimedia interface (HDMI (registered trademark)) port.

The programs are provided via a network or a computer-readable medium such as a CD-ROM, a DVD-ROM, or a memory card. The RAM 2014, the ROM 2026, or the flash memory 2024 is an example of the computer-readable medium. The programs are installed in the flash memory 2024, the RAM 2014 or the ROM 2026, and are executed by the CPU 2012. Information processing written in these programs is read by the computer 2000, and provides cooperation between the programs and the various types of hardware resources described above. An apparatus or a method may be configured by implementing operation or processing of information according to a use of the computer 2000.

For example, when communication is performed between the computer 2000 and an external device, the CPU 2012 may execute a communication program loaded in the RAM 2014, and instruct the communication interface 2022 to execute communication processing, based on processing written in the communication program.

The communication interface 2022, under the control of the CPU 2012, reads transmission data stored in a transmission buffer processing region provided in a recording medium such as the RAM 2014 and the flash memory 2024, transmits the read transmission data to the network, and writes reception data received from the network into a reception buffer processing region or the like provided on the recording medium.

Moreover, the CPU 2012 may cause all or necessary portion of a file or a database stored in the recording medium such as the flash memory 2024 or the like, to be read by the RAM 2014, and execute various types of processing on the data on the RAM 2014. Next, the CPU 2012 writes back the processed data into the recording medium.

Various types of programs and various types of information such as data, a table, and a database may be stored in the recording medium, and subjected to information processing. The CPU 2012 may execute, on the data read from the RAM 2014, various types of processing including various types of operations, information processing, conditional judgement, conditional branching, unconditional branching, information retrieval/replacement, or the like described in this specification and specified by instruction sequences of the programs, and writes back the results into the RAM 2014. Moreover, the CPU 2012 may retrieve information in a file, a database, or the like in the recording medium. For example, when a plurality of entries each having an attribute value of a first attribute associated with an attribute value of a second attribute is stored in the recording medium, the CPU 2012 may retrieve, out of said plurality of entries, an entry with the attribute value of the first attribute specified that meets a condition, read the attribute value of the second attribute stored in said entry, and thereby acquire the attribute value of the second attribute associated with the first attribute meeting a predetermined condition.

The programs or software module described above may be stored on the computer 2000 or in a computer-readable medium near the computer 2000. A recording medium such as a hard disk or RAM provided in a server system connected to a dedicated communication network or the Internet can be used as the computer-readable medium. The programs stored in the computer-readable medium may be provided to the computer 2000 via the network.

The program installed in the computer 2000 and causing the computer 2000 to function as the control apparatus 200 may instruct the CPU 2012 or the like to cause the computer 2000 to function as each unit of the control apparatus 200. The information processing written in these programs are read by the computer 2000 to cause the computer to function as each unit of the control apparatus 200, which is specific means realized by the cooperation of software and the various types of hardware resources described above. Then, these specific means implement operations or processing of information corresponding to the intended use of the computer 2000 in this embodiment, so that the control apparatus 200 is constructed as a specific information processing apparatus corresponding to the intended use.

Various embodiments have been described with reference to the block diagram or the like. In the block diagram, each block may represent (1) a step of a process in which an operation is executed, or (2) each unit of the apparatus having a role in executing the operation. Specific steps and each unit may be implemented by a dedicated circuit, a programmable circuit supplied along with a computer-readable instruction stored on a computer-readable medium, and/or a processor supplied along with the computer-readable instruction stored on the computer-readable medium. The dedicated circuit may include a digital and/or analog hardware circuit, or may include an integrated circuit (IC) and/or a discrete circuit. The programmable circuit may include a reconfigurable hardware circuit including: logical AND, logical OR, logical XOR, logical NAND, logical NOR, and other logical operations; a memory element such as a flip-flop, a register, a field programmable gate array (FPGA), a programmable logic array (PLA), or the like; and so on.

The computer-readable medium may include any tangible device capable of storing an instruction executed by an appropriate device, so that the computer-readable medium having the instruction stored thereon constitutes at least a part of a product including an instruction that may be executed in order to provide means to execute an operation specified by a processing procedure or a block diagram. Examples of the computer-readable media may include an electronic storage medium, a magnetic storage medium, an optical storage medium, an electromagnetic storage medium, a semiconductor storage medium, or the like. More specific examples of the computer-readable medium may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disk read-only memory (CD-ROM), a digital versatile disk (DVD), a Blu-ray (registered trademark) disk, a memory stick, an integrated circuit card, or the like.

The computer-readable instruction may include either of source code or object code written in any combination of one or more programming languages including: an assembler instruction, an instruction-set-architecture (ISA) instruction, a machine instruction, a machine dependent instruction, a microcode, a firmware instruction, state-setting data; or an object oriented programming language such as Smalltalk (registered trademark), JAVA (registered trademark), C++, or the like; and a conventional procedural programming language such as a "C" programming language or a similar programming language.

The computer-readable instruction may be provided to a general-purpose computer, a special-purpose computer, or a processor or a programmable circuit of another programmable data processing apparatus, locally or via a local area network (LAN), a wide area network (WAN) such as the Internet or the like, and the computer-readable instruction may be executed in order to provide a means to execute operations specified by the described processing procedure or the block diagram. Examples of the processor include a computer processor, a processing unit, a microprocessor, a digital signal processor, a controller, a microcontroller, or the like.

While the embodiments of the present invention have been described, the technical scope of the present invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the present invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES 10 system
20 movable object
22 automated drive control apparatus
24 notification apparatus
28 communication apparatus
29 sensor
40 notification server
50 content server
90 network
200 control apparatus
210 travel road specification unit
220 setting unit
240 notification plan generation unit
270 notification control unit
280 storage device
290 communication apparatus
300 road scheduled to be travelled
310 management unit
330 notification data
390 spot
910 management unit
920 management unit
930 management unit
2000 computer
2010 host controller
2012 CPU
2014 RAM
2020 input/output controller
2022 communication interface
2024 flash memory
2026 ROM
2040 input/output chip

What is claimed is:

1. A control apparatus for controlling notification data presented to an occupant of a movable object having an automated driving function including a plurality of automated driving modes according to an operation amount of an automated drive control apparatus, the control apparatus comprising:
a travel road specification unit configured to specify a road scheduled to be travelled by the movable object corresponding to a destination set for the movable object;
a setting unit configured to set, according to the road scheduled to be travelled, a switching recommendation point for switching from automated drive to driver-led manual drive on the road scheduled to be travelled, set the automated driving mode scheduled for each of the road scheduled to be travelled, and estimate a scheduled passing time instant at which the movable object passes the switching recommendation point; and
a notification plan generation unit configured to generate a notification plan for presenting predetermined notification data to the occupant of the movable object according to the switching recommendation point and the scheduled passing time instant, wherein
the notification data includes a plurality of types, an association degree with the plurality of automated driving modes being previously set for each of the plurality of types,
the notification plan is configured by including the notification data and a plurality of management units in which the notification data is set,
the plurality of management units are set in time units, corresponding to the switching recommendation point for switching the automated driving mode and the scheduled passing time instant according to the switching recommendation point, and
the notification plan generation unit is configured to refer to the association degree and the automated driving mode to set, in the management unit, the notification data and generate the notification plan.

2. The control apparatus according to claim 1, wherein:
the notification plan generation unit is configured to set the notification data permitted according to the automated driving mode set for the road scheduled to be travelled in the management unit.

3. The control apparatus according to claim 2, further comprising:
a notification control unit configured to cause notification based on the notification data in accordance with the notification plan generated by the notification plan generation unit.

4. The control apparatus according to claim 3, wherein the notification control unit is configured to further cause change notice of the automated driving mode to the occupant at the switching recommendation point according to the automated driving mode set for the road scheduled to be travelled.

5. The control apparatus according to claim 4, wherein:
the setting unit is configured to change the automated driving mode recommended for the road scheduled to be travelled according to the notification data; and
the notification control unit is configured to present the notification data serving as a change factor of the automated driving mode for the road scheduled to be travelled before the switching recommendation point of the automated driving mode to be changed is reached.

6. The control apparatus according to claim 5, wherein along with presentation of the notification data serving as the change factor of the automated driving mode, in a case where another switching recommendation point exists in a predetermined range from the point where the driving mode is to be changed according to the change factor of the automated driving mode, the setting unit is configured to abort the change of the automated driving mode at the other switching recommendation point.

7. The control apparatus according to claim 1, wherein the notification plan generation unit is configured to generate a plurality of notification plans including a plurality of pieces of the notification data from a current location of the movable object, and select and present notification data corresponding to the switching recommendation point among the plurality of pieces of notification data included in the plurality of generated notification plans.

8. The control apparatus according to claim 1, wherein the notification plan generation unit is configured to generate a plurality of notification plans including a plurality of pieces of the notification data from a passing point of the movable object, and select and present notification data corresponding to the switching recommendation point among the plurality of pieces of notification data included in the plurality of generated notification plans.

9. The control apparatus according to claim 1, wherein:
the notification plan generation unit is configured to generate a plurality of notification plans including a plurality of pieces of the notification data from a destination of the movable object, and select and present notification data corresponding to the switching recommendation point among the plurality of pieces of notification data included in the plurality of generated notification plans.

10. The control apparatus according to claim 1, wherein the notification plan generation unit is configured to generate a plurality of notification plans including a plurality of pieces of the notification data from a current location, a passing point, and a destination of the movable object, and select and present notification data corresponding to the switching recommendation point among the plurality of pieces of notification data included in the plurality of generated notification plans.

11. The control apparatus according to claim 1, wherein the movable object is a vehicle.

12. A system comprising:
the control apparatus according to claim 1; and
the movable object.

13. A non-transitory computer-readable storage medium having recorded thereon a program that causes a computer to function as a control apparatus configured to control notification data presented to an occupant of a movable object having an automated driving function including a plurality of automated driving modes according to an operation amount of an automated drive control apparatus, the program causing the computer to function as:
  a travel road specification unit configured to specify a road scheduled to be travelled by the movable object corresponding to a destination set for the movable object;
  a setting unit configured to set, according to the road scheduled to be travelled, a switching recommendation point for switching from automated drive to driver-led manual drive on the road scheduled to be travelled, set the automated driving mode scheduled for each of the road scheduled to be travelled, and estimate a scheduled passing time instant at which the movable object passes the switching recommendation point; and
  a notification plan generation unit configured to generate a notification plan for presenting predetermined notification data to the occupant of the movable object according to the switching recommendation point and the scheduled passing time instant, wherein
  the notification data includes a plurality of types, an association degree with the plurality of automated driving modes being previously set for each of the plurality of types,
  the notification plan is configured by including the notification data and a plurality of management units in which the notification data is set,
  the plurality of management units are set in time units, corresponding to the switching recommendation point for switching the automated driving mode and the scheduled passing time instant according to the switching recommendation point, and
  the notification plan generation unit is configured to refer to the association degree and the automated driving mode to set, in the management unit, the notification data and generate the notification plan.

14. A control method of controlling notification data presented to an occupant of a movable object having an automated driving function including a plurality of automated driving modes according to an operation amount of an automated drive control apparatus, the control method comprising:
  specifying a road scheduled to be travelled by the movable object corresponding to a destination set for the movable object;
  setting, according to the road scheduled to be travelled, a switching recommendation point for switching from automated drive to driver-led manual drive on the road scheduled to be travelled, setting the automated driving mode scheduled for each of the road scheduled to be travelled, and estimating a scheduled passing time instant at which the movable object passes the switching recommendation point; and
  generating a notification plan for presenting predetermined notification data to the occupant of the movable object according to the switching recommendation point and the scheduled passing time instant, wherein
  the notification data includes a plurality of types, an association degree with the plurality of automated driving modes being previously set for each of the plurality of types,
  the notification plan is configured by including the notification data and a plurality of management units in which the notification data is set,
  the plurality of management units are set in time units, corresponding to the switching recommendation point for switching the automated driving mode and the scheduled passing time instant according to the switching recommendation point, and
  generating the notification plan includes referring to the association degree and the automated driving mode to set, in the management unit, the notification data and generate the notification plan.

* * * * *